United States Patent
Spiewak

[11] Patent Number: 6,095,801
[45] Date of Patent: *Aug. 1, 2000

[54] FLEXIBLE TORCH ASSEMBLY

[76] Inventor: John Spiewak, 6180 Hill Top Dr., Coal City, Ill. 60416

[ * ] Notice: This patent issued on a continued prosecution application filed under 37 CFR 1.53(d), and is subject to the twenty year patent term provisions of 35 U.S.C. 154(a)(2).

[21] Appl. No.: 08/782,068

[22] Filed: Jan. 13, 1997

[51] Int. Cl.[7] .................................................. F23D 14/28
[52] U.S. Cl. .................. 431/344; 126/406; 239/588; 285/146.1
[58] Field of Search ................... 126/406, 407, 126/414, 415; 431/344, 355, 345, 353, 350; 285/184, 907, 264, 265, 145.5, 146.1, 146.2, 146.3; 403/114, 113, 344, 19

[56] References Cited

U.S. PATENT DOCUMENTS

| | | | |
|---|---|---|---|
| 2,203,210 | 6/1940 | Young | 239/588 |
| 3,001,573 | 9/1961 | Hunter | 431/344 |
| 3,441,360 | 4/1969 | Johnson | 126/406 |
| 3,674,413 | 7/1972 | Fraser | 239/588 |
| 3,999,003 | 12/1976 | Willgohs et al. . | |
| 4,538,984 | 9/1985 | Nakagawa . | |
| 4,571,476 | 2/1986 | Pazzaglia . | |
| 4,738,242 | 4/1988 | Hart | 431/344 |
| 4,809,956 | 3/1989 | Donze . | |
| 4,873,419 | 10/1989 | Acheson . | |
| 5,197,767 | 3/1993 | Kimura et al. | 285/146.1 |
| 5,263,646 | 11/1993 | McCauley | 239/588 |
| 5,408,988 | 4/1995 | Acheson . | |
| 5,449,206 | 9/1995 | Lockwood . | |
| 5,531,592 | 7/1996 | Tasi . | |

*Primary Examiner*—James C. Yeung
*Attorney, Agent, or Firm*—Niro, Scavone, Haller & Niro

[57] ABSTRACT

An torch having a configuration for having a plurality of self sustaining positions is disclosed. Specifically, the present invention discloses a flexible torch sleeve including a plurality of pivotable elements in combination with a torch tip that reduces or eliminates thermal conductivity by the plume to the torch sleeve, thus enabling the adjustment of the sleeve to a variety of self sustaining positions during operation.

7 Claims, 4 Drawing Sheets

FIG. 5
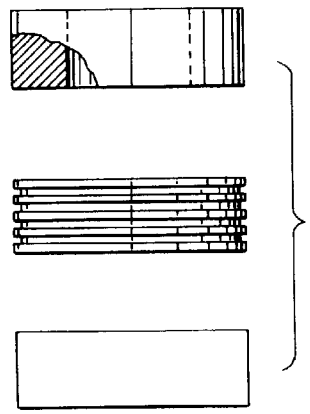
FIG. 6
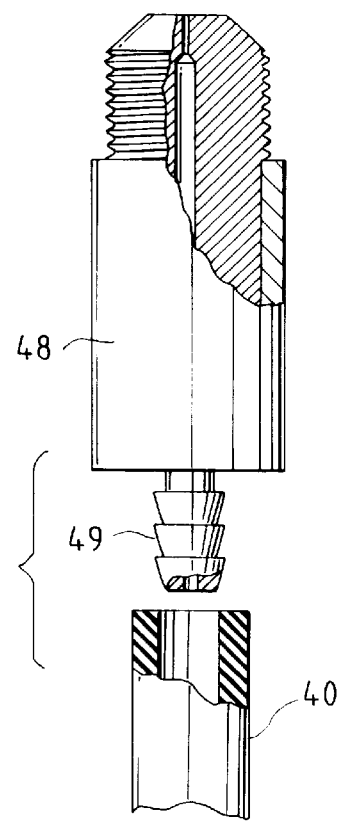
FIG. 7a
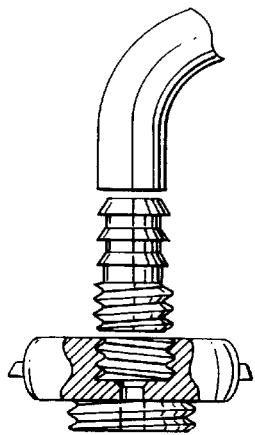
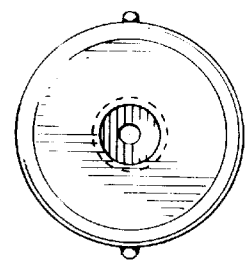
FIG. 7b
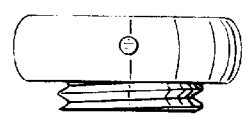
FIG. 7c
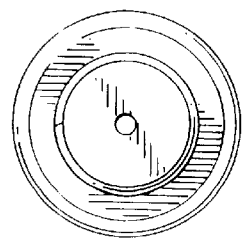
FIG. 7d

FLEXIBLE TORCH ASSEMBLY

BACKGROUND OF THE INVENTION

The present invention relates to a novel torch assembly configuration. Specifically, the present invention discloses a pivotable sleeve in combination with a thermal dissipating torch tip so as to enable the adjustment and gripping of a propane, acetylene, or similar torch sleeve by its user during operation.

Torches powered by propane, acetylene, and similar sources have a wide variety of uses, including pipe fitting and surface preparation. Of the countless examples of applications possible are soldering, thermal expansion of plastic pipe joints, preparation of painted surfaces for scraping, and loosing of nuts or similar fasteners.

A number of environments involve very limited working spaces. Also, many parts being treated by such torches involve application of the torch plume around the radius of the part. Finally, many torch applications involve simultaneous mechanical activity by the use, thus minimizing the availability of "free hands" to adjust or maintain the torch plume in a variety of positions. Given the wide variety of uses for such torch applications, the industry needs a simple inexpensive design for an adjustable torch sleeve that can be manipulated or held during operation in a variety of self sustaining positions.

A number of prior torch designs have attempted to deal some of these needs. Currently available torches create self a sustainable position by the use of a rigid metal nozzle incorporating an angular torch tip. The manipulation of the nozzle necessarily results in rotation of the fuel tank. This configuration is both impractical and unsafe for a variety of reasons. First, since working environments are often highly limited in space, rotation of the tank may be impossible. Further, any attempt to adjust the torch plume position by rotating the nozzle may loosen the connection between the tank and the nozzle, thus creating a safety hazard. A further safety hazard is evident when the user attempts to manipulate the nozzle during use and discovers to his dismay that the metal nozzle has been subject to intense thermal conduction.

Other prior designs have used a braided hose to connect a torch tip to a propane tank or similar fuel source. While his arrangement is flexible, it does not allow for a self sustainable position (i.e., one that can be maintained without user intervention). Furthermore, the nature of flexible hoses currently used with propane torches provide little or no ability for the user to carry the torch assembly safely by gripping the hose.

At least one prior design has incorporated cooling fins for dissipation of heat generated by the plume. While such a design allows for gripping the hose area during operation, it does not allow self sustainable positions by the hose. Further, even when this design is combined with the braided hose connection described above, the user must still carefully monitor his or her manipulation of the hose, since it is prone to kinking or crimping which adversely impacts the effect of the torch.

Still another design shows the ability to use a gas torch with a plurality of rigid extendable tubes. This design calls for the transfer of gases and/or fluids for the use of the torch by the tubes themselves, without using flexible hoses or with only extremely short flexible hoses. Such a configuration further calls for a separate support and guide means extending in tubular supports that form a mechanical, deformable parallelogram. This design is unsatisfactory in that it does not allow for self sustainable positions by the torch tip, nor does it allow for a simple support design that can be retrofitted on existing braided hoses. Also, this design does not account for the need to manipulate the tubes directly during operation, nor does it account for the need to operate in small workspaces. More importantly, this design requires the rigid tube sections to act as the only container for the gas or fluids being conveyed to the torch tip. Thus, any crack or gap in the rigid tube connectors could result in a gas leak safety hazard.

In other areas of technology (e.g., flashlights and fans) have employed ball and socket elements to create tubing lengths that are capable of being pivoted in a variety of self sustainable positions. However, such elements, as they are currently employed, are capable of unlimited circumferential torque. Such a configuration in the present application, without more, would lead to kinking and crimping of any gas hose contained within the tubing, thus creating a safety hazard and preventing the operation of the torch.

In short, none of the prior art, either alone or in combination, discloses a torch sleeve that is flexible to a plurality of self sustaining positions. Specifically, no existing design teaches the combination of a torch tip that substantially eliminates thermal conductivity to the sleeve with a sleeve that includes one or more pivotable elements that can be adjusted to a variety of self sustainable positions during operation.

SUMMARY OF THE INVENTION

The present invention includes an torch having a sleeve and a tip. The torch sleeve preferably includes one or more elements that pivot into a variety of self sustainable positions, while the tip dissipates heat from the torch plume to enable adjustment of the sleeve during use.

Specifically, the present invention calls for a sleeve comprising a series of pivotable elements connected in a ball and socket arrangement. This sleeve preferably surrounds a braided gas hose which conveys gas from a tank through an adapter into the torch tip. The braided hose is connected to the adapter by a hose barb. The torch tip preferably includes a number of vent holes, cooling fins, or similar heat dissipation means to enable the user to grip the sleeve elements for adjustment during use. The present invention prevents the kinking or crimping by limiting rotation around the circumference of the sleeve elements. Such limitations are provided by a ear indent arrangement in the adapter, or alternatively through a locking pin arrangement in one or more of the sleeve elements. The present invention provides an additional safety element by preferably limiting the rotation of the torch tip to a 180° rotation, or in the case of an adapter extending out of the side of the tank, a 90° rotation. This added safety limitation prevents the torch plume from being applied to the fuel tank, thus eliminating the possibility of catastrophic failure.

Accordingly, an object of this invention is to provide a torch sleeve that can be adjusted to a plurality of self-sustainable positions.

A further object of the present invention is to provide a torch assembly that enables the manipulation of the torch sleeve to a variety of positions during operation.

Another object of the present invention is to provide limitations on the flexibility of the torch sleeve to eliminate kinking, crimping, or catastrophic failure.

Still another object of the present invention is to provide a torch assembly that can be used in working environments having limited space, or in applications requiring application of a torch plume around the circumference of a fixed position or part.

Yet another object of the present invention is to provide a flexible, self-sustainable torch sleeve that can be retrofitted to existing torch designs.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 5 is an exploded view of the collar feature between the torch tip and torch sleeve of the present invention.

FIG. 6 is a partially exposed, exploded side view of the hose barb connection to the braided hose for the present invention.

FIGS. 7(a), (b), (c) and (d) are exposed side, top, side, and bottom views, respectively, of the ear indent feature of the adapter of the present invention.

DETAILED DESCRIPTION OF THE PREFERRED EMBODIMENT

Figure 1:
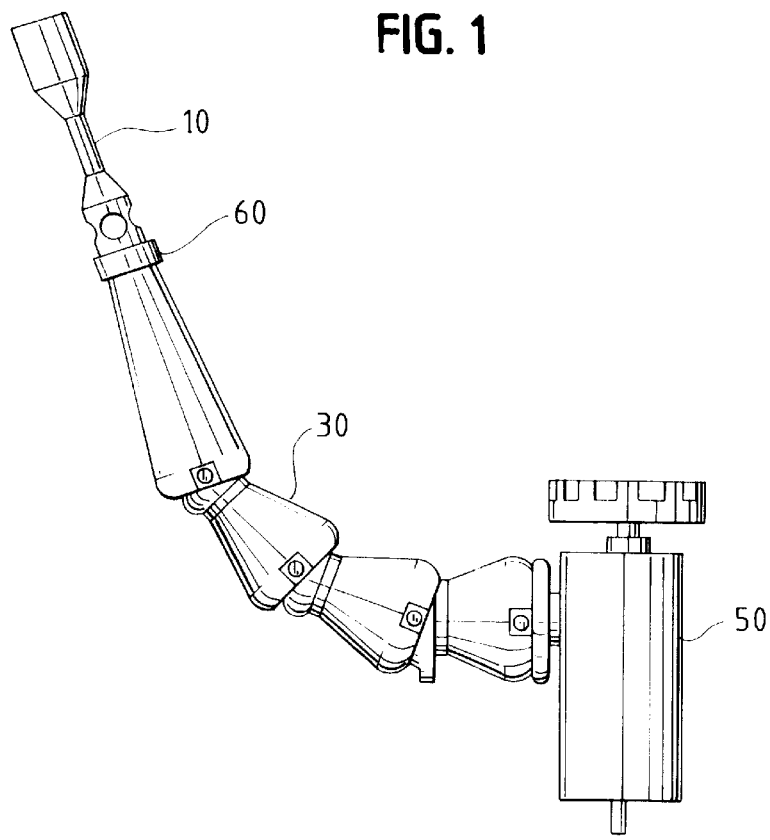
FIG. 1 is the side view of the torch assembly of the present invention.

Referring to FIG. 1, the torch of the present invention consists of three main elements, the torch tip 10, the sleeve section 30 and the regulator section 50.

Figure 2:
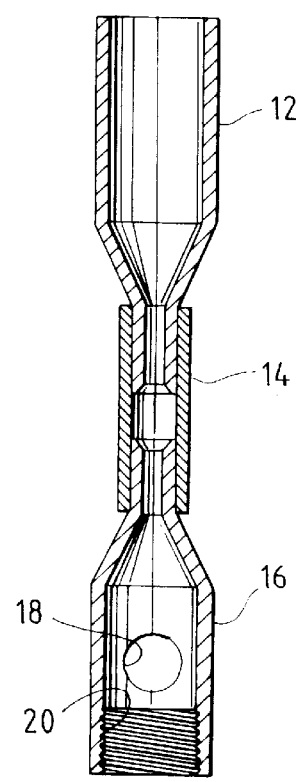
FIG. 2 is the side cross-section of the torch tip feature of the present invention.
Figure 3B:
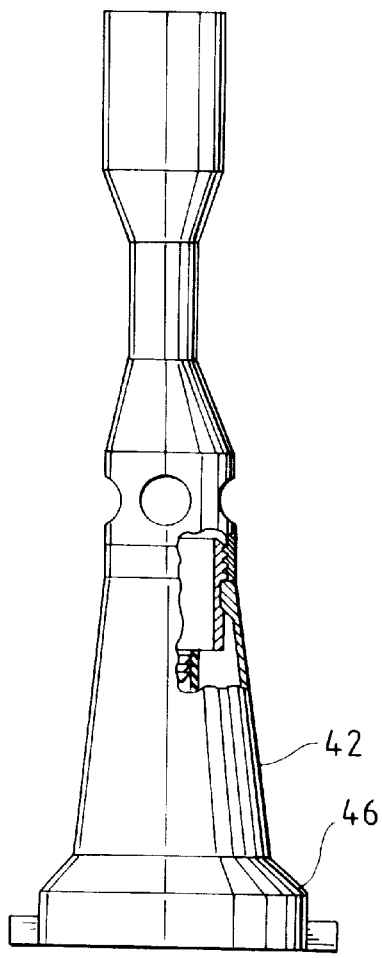
FIGS. 3(a) and (b) are exposed bottom and side views, respectively, showing the interaction of the top sleeve element and the torch tip.

The torch tip 10 can be manufactured in three different styles. The most preferred style as shown in FIG. 2 consists of a distal end 12, a neck 14 and a proximal end 16. The distal end 12 is a metallic, tapered, funnel-shaped extension creating the preferred plume of the present torch assembly invention. The neck 14 is essentially a cylindrical tube that can either frictionally or threadingly connect the distal and proximal ends of the torch tip to form an annulus. The specific preferred diameter of the connector element and the distal end 12 of the torch tip 10 vary depending upon the fuel supply and desired application for the torch assembly and can be determined by those of ordinary skill in the art. The proximal end 16 of torch tip 10 is used to connect the torch tip to the torch sleeve 30. The proximal end 16 preferably has a plurality of vent holes 18 which facilitate the entry of air into the torch tip 10 to mix with the fuel mixture and dissipate any thermal conduction generated by the plume. The proximal end 16 likewise has a tapered, funnel shape and further is comprised of a thin metal wall to further ensure that the torch tip 10 remains cool while in use. Alternatively, the torch tip cooling process can be further facilitated by the presence of cooling fins (not shown) on either the neck 14 and/or proximal end 16. The use of such cooling fins is taught, for example, in U.S. Pat. No. 5,408,988.

Figure 4A:
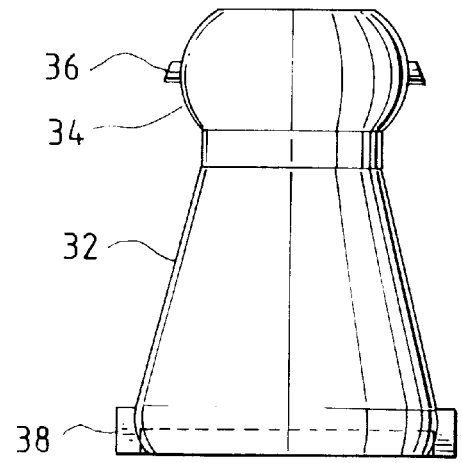
FIGS. 4(a) and (b) are side and bottom views, respectively, showing the rotation limitation features of the sleeve element of the present invention.
Figure 4B:
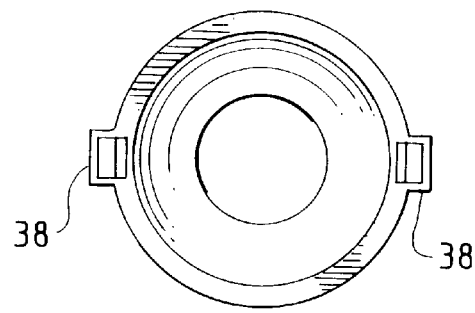

The torch sleeve section 30 includes preferably one or more ball and socket elements 32, as is shown in FIGS. 4(a) and 4(b). The elements 32 are preferably made of molded plastic and are preferably made in accordance with the teachings of U.S. Pat. No. 5,449,206. The elements define an annular groove for a braided gas hose 40 or similar fuel delivery line. The elements 32 include an upper portion 34 and a lower portion 38. The upper portion 34 preferably includes a plurality of ears 36 located on opposite ends of the circumference of the upper portion. These ears are designed to substantially eliminate the circumferential rotation of the sleeve section during use. The ears preferably mate in a locking fashion with indents defined in the bottom of the lower portion 38, as shown in FIG. 4(b). Thus, these ears not only prohibit circumferential rotation, but also lock each of the individual elements together. The ball and socket configuration shown by the upper portion 34 and lower portion 38 allow lateral rotation of up to approximately 180°. Further rotation is not normally desired due to the danger of turning the plume back upon the fuel tank and also due to the danger of crimping in the gas hose 40 threaded inside of the elements 32. The gas hose 40 (not shown) is preferably made of Buna-N rubber and has a nylon overbraided jacket to ensure safe gas flow from the tank to the torch tip 10.

Figure 3A:
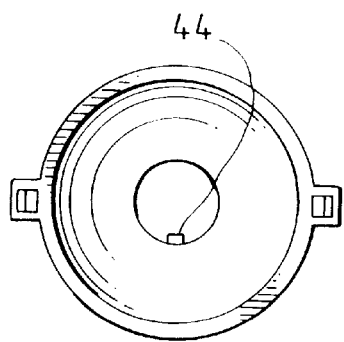

The torch sleeve section includes a top element 42 as shown in FIGS. 3(a) and (b). The top element 42 has a long tapered shape. The distal, or upper, portion of the top element 42 includes a male key element 44 which prohibits the rotation of the sleeve once assembled. The lower section 46 of the top element 42 is otherwise identical to the remaining elements 32. It should be understood that the torch sleeve section 30 can have anywhere between 1 and 25 elements, although experimentation to date has shown that the preferred length for a home propane torch includes approximately 6 to 10 elements.

The sleeve section 30 is further attached to the torch tip 10 and to the gas hose 40 by means of a hose barb 48, shown in FIG. 6. The hose barb 48 is used to restrain the braided gas hose 40, and includes a number of projections 49 curving upwards that bias the removal of the barb once it is pushed into the gas hose 40. The upper end of the barb 42 is threaded for a making engagement with the proximal end 16 of torch tip 10. The sides of the barb 42 also have vertical grooves for mating with the male key element 44, thus securing the distal end of the sleeve section to the braided hose/torch tip interface, and further safeguarding against circumferential rotation of the sleeve section. The connection between the sleeve section and the torch tip 10 is further stabilized by a spacer 60, as shown in FIGS. 1 and 5. The spacer occupies any gap between the torch tip 10 and the sleeve section 30 created by the hose 40 or the barb 42, thus securing a snug fit. The outer surface of the spacer 60 can be smooth, grooved, or knurled, depending upon the need to dismantle the torch tip or sleeve sections of the assembly.

The assembly of the present invention also includes a regulator section 50 that is connected to the sleeve section 30 by means of an adapter 52, shown in FIGS. 7(a)–(d). The adapter 52 is connected to a regulator or gas source by an external thread 54, located on the bottom of the adapter. The diameter of this thread is dictated by the preexisting regulator or gas source desired. The top or distal portion of the adapter has an internal thread 56, which is used to engage the reciprocal thread for a barb 58 that engages the braided hose 40 in substantially an identical manner as hose barb 42. The adapter 52 can likewise have the same ear and dent arrangement as is preferred for each of the elements 32, thus facilitating a locking, no torque engagement with the element 32 closest to the adapter. The adapter can likewise be integrally molded with the barb 58, although a threaded engagement is preferred in order to enable frictional engagement with a variety of diameters of hoses.

Figure 8:
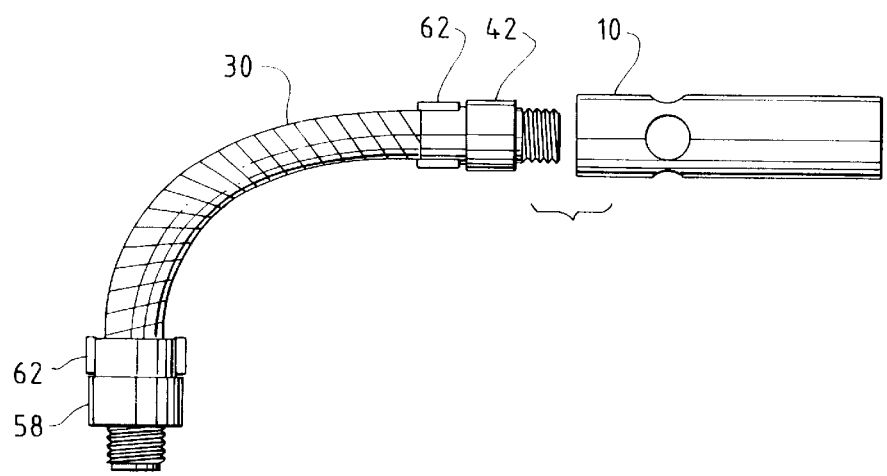
FIG. 8 shows a side view of an alternative preferred embodiment of the present invention employing a flexible metallic sleeve section.
Figure 9:
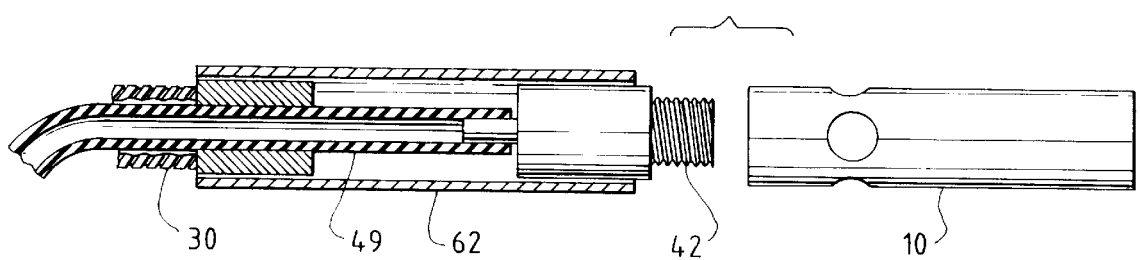
FIG. 9 shows an exposed side view of the crimp tube engagement feature of the alternative preferred embodiment of the present invention.

Another alternative embodiment would incorporate a flexible metal sleeve section 30 in place of the ball and socket configuration, as shown in FIG. 8. The use of such metallic hoses in other areas of technology, such as adjustable lamps, is well known, and the manufacture and composition of such components is understood by those of ordinary skill in the art. The flexible metal sleeve section 30 in this preferred embodiment would surround the majority of the braided hose 40, leaving only small (approximately 1 inch) portions extending out of each end of the hose for attachment to the torch tip section and regulator section. Attachment to these sections is accomplished by means of a crimp tube 62, as shown in FIG. 9. This crimp tube would be attached at one end to the braided hose 40 and at the other end to the hose barb 42 (or the hose barb 58 for the regulator section, if appropriate), and could be crimped or welded to facilitate a permanent connection. This configuration has the advantage of guiding the hose 40 to the hose barb to enable a secure "finger fit" connection during assembly, thus providing an easier method of manufacture.

Of course, it should be understood that various changes and modifications to the preferred embodiments described herein will be apparent to those skilled in the art. For instance, the limitation on circumferential torque can be enabled by the insertion of a universal joint 59 (not shown) on the bottom of adapter 52. This configuration would be an alternative of the ear and dent arrangement for the sleeve section insofar as any torque would be substantially borne by the universal joint and not the gas hose 40, thus avoiding undesirable kinking or crimping. Likewise the individual sleeve elements 32 can be molded as one flexible integral unit. This alternative design could be used, for instance, in order to further restrict air flow from the braided hose. Such changes and modifications can be made without departing from the spirit and scope of the present invention and without diminishing its attendant advantages. It is, therefore, intended that all such changes and modifications be covered by the following claims.

What is claimed is:

1. A flexible torch assembly for supplying a fuel source to a heat source, said assembly comprising:
   (a) a torch tip having an annulus therein;
   (b) a fuel line having a first end and a second end, said fuel line first end being in communication with the torch tip annulus;
   (c) an adapter for connecting the fuel line to the fuel source, the adapter being engaged to the fuel line second end;
   (d) at least one sleeve element, the sleeve element defining a annulus for containing and supporting the fuel line, the sleeve element being pivotably engaged with the adapter, thus facilitating a variety of supported, adjustable positions for the torch tip; and
   (e) means for restricting the rotating the sleeve element around the radius of the sleeve element annulus.

2. The assembly of claim 1, further comprising at least one ear on said adapter and at least one reciprocal indent on said sleeve element engaging the ear thereby creating a pivotable engagement between the adapter and the sleeve element which restricts the rotation of the sleeve element around the circumference of the adapter.

3. A flexible torch assembly for enabling a variety of self-sustainable, adjustable positions for the application of fuel to a torch heat source, the assembly comprising:
   (a) a torch tip, the torch tip including a distal portion and a proximal portion;
   (b) a fuel line having a first end and a second end, the second of the fuel line being frictionally engaged to the proximal portion of the torch tip;
   (c) an adapter for connecting the first end of the fuel line to the fuel source, the adapter being frictionally engaged to the first end of the fuel line;
   (d) a plurality of sleeve elements, said elements being connected so as to define a sleeve section having a proximal end and a distal end, the sleeve section defining an annulus for containing and supporting the fuel line, the distal end annulus of the sleeve end extending approximately to the second end of the fuel line, the proximal end of the sleeve section connected to the adapter, thus facilitating a variety of self supported, adjustable positions for the torch tip.

4. The assembly of claim 3, further comprising means for restricting the rotating the sleeve section around the radius of the sleeve section annulus.

5. The assembly of claim 3, further comprising at least one ear on the adapter and at least one reciprocal indent on the sleeve element on the proximal end of the sleeve section, said indent engaging the ear, thereby facilitating a pivotable engagement between the adapter and the sleeve element which restricts the rotation of the sleeve element around the circumference of the adapter.

6. The assembly of claim 3, further comprising at least one ear on a first element of one of the plurality of the sleeve elements and at least one reciprocal indent on a second sleeve element engaging the distal end of the first sleeve element, said indent engaging the ear, thereby facilitating a pivotable engagement between the adapter and the sleeve element which limits the rotation of the sleeve element around the circumference of the sleeve section.

7. The assembly of claim 3, wherein each of said plurality of sleeve elements having an rounded, upper portion and a broader, lower portion for receiving an upper sleeve element portion, whereby the upper and lower portions facilitate a pivotable connection between the sleeve elements through a ball and socket configuration.

* * * * *